US 12,065,251 B2

(12) United States Patent
Army et al.

(10) Patent No.: US 12,065,251 B2
(45) Date of Patent: Aug. 20, 2024

(54) CENTRIFUGAL WATER COLLECTOR WITH CONICAL WATER SCUPPER

(71) Applicant: Hamilton Sundstrand Corporation, Charlotte, NC (US)

(72) Inventors: Donald E. Army, Enfield, CT (US); Patrick McCord, Norwich, CT (US)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 0 days.

(21) Appl. No.: 17/362,195

(22) Filed: Jun. 29, 2021

(65) Prior Publication Data

US 2022/0411073 A1    Dec. 29, 2022

(51) Int. Cl.
*B01D 45/12* (2006.01)
*B01D 45/04* (2006.01)
*B01D 50/20* (2022.01)
*B01D 53/26* (2006.01)
*B64D 13/06* (2006.01)

(52) U.S. Cl.
CPC ............. *B64D 13/06* (2013.01); *B01D 45/04* (2013.01); *B01D 45/12* (2013.01); *B01D 50/20* (2022.01); *B01D 53/265* (2013.01); *B01D 2259/4575* (2013.01); *B64D 2013/0662* (2013.01)

(58) Field of Classification Search
CPC ............ B64D 13/06; B64D 2013/0662; B01D 45/04; B01D 45/12; B01D 50/20; B01D 53/265; B01D 2259/4575
See application file for complete search history.

(56) References Cited

U.S. PATENT DOCUMENTS

| | | | | |
|---|---|---|---|---|
| 1,791,304 A | * | 2/1931 | Flick | B04C 5/10 55/455 |
| 2,705,053 A | * | 3/1955 | Morris | F16N 39/002 210/512.1 |
| 3,989,489 A | * | 11/1976 | Van't Sant | B01D 45/16 55/338 |
| 4,050,913 A | * | 9/1977 | Roach | B01D 50/20 96/381 |
| 4,238,210 A | * | 12/1980 | Regehr | B04C 3/00 55/423 |

(Continued)

FOREIGN PATENT DOCUMENTS

EP    3412354 A1    12/2018

OTHER PUBLICATIONS

European Search Report; European Application No. 22181667.1; Date: Nov. 28, 2022; 11 pages.

*Primary Examiner* — Dung H Bui
(74) *Attorney, Agent, or Firm* — CANTOR COLBURN LLP

(57) ABSTRACT

A water extractor for an environmental control system of an aircraft includes a separation mechanism configured to divide an airflow into a first airflow and a second airflow. The separation mechanism includes an inlet conduit, a body in fluid communication with the inlet conduit, and at least one coalescing feature arranged within an interior of the body. A water extraction vessel is arranged in fluid communication with the separation mechanism. The water extraction vessel includes a first portion for receiving the first airflow and a second portion for receiving the second airflow. The first portion is configured to collect and remove water from the first airflow.

9 Claims, 10 Drawing Sheets

(56) References Cited

U.S. PATENT DOCUMENTS

| | | | | |
|---|---|---|---|---|
| 4,255,174 A | * | 3/1981 | Simpson | B01D 45/16 55/306 |
| 4,311,494 A | * | 1/1982 | Conner | F02M 35/022 55/394 |
| 4,517,813 A | | 5/1985 | Eggebrecht et al. | |
| 4,537,608 A | * | 8/1985 | Koslow | B01D 50/20 55/347 |
| 4,681,610 A | | 7/1987 | Warner | |
| 4,960,525 A | * | 10/1990 | Dalby | B01D 21/34 209/729 |
| 4,985,058 A | | 1/1991 | Prinsloo et al. | |
| 6,019,825 A | * | 2/2000 | Greene | B04C 5/103 96/216 |
| 6,331,195 B1 | | 12/2001 | Faust et al. | |
| 6,524,373 B2 | * | 2/2003 | Afeiche | B01D 45/16 55/423 |
| 6,837,912 B1 | * | 1/2005 | Heumann | B04C 5/103 55/424 |
| 7,338,545 B2 | * | 3/2008 | Bazzarella | H01M 8/04164 55/423 |
| 7,691,185 B2 | * | 4/2010 | Darke | B04C 3/06 55/428 |
| 7,708,146 B2 | * | 5/2010 | Kruyer | B03D 1/1418 210/512.1 |
| 7,931,719 B2 | * | 4/2011 | Sams | B01D 45/12 55/456 |
| 8,025,713 B2 | * | 9/2011 | Dou | B04C 11/00 55/459.3 |
| 8,087,293 B2 | * | 1/2012 | Dou | G01F 1/74 73/200 |
| 8,875,535 B2 | * | 11/2014 | Peacos, III | B64D 13/00 62/93 |
| 9,067,163 B2 | * | 6/2015 | McColgan | B64D 13/00 |
| 9,199,248 B2 | * | 12/2015 | Au | B03C 9/00 |
| 9,272,293 B2 | | 3/2016 | Bizzarro et al. | |
| 9,616,431 B2 | * | 4/2017 | Lyon | B04C 5/085 |
| 10,265,651 B2 | | 4/2019 | Zager et al. | |
| 10,526,090 B2 | | 1/2020 | Himmelmann | |
| 10,633,099 B2 | * | 4/2020 | Walsh | F01D 15/005 |
| 10,730,630 B2 | * | 8/2020 | Army | B64D 13/02 |
| 10,744,437 B2 | | 8/2020 | Himmelmann | |
| 10,765,982 B2 | | 9/2020 | Martin et al. | |
| 11,090,592 B2 | * | 8/2021 | Army | B04C 3/06 |
| 11,154,804 B2 | * | 10/2021 | Palmer | B01D 45/16 |
| 2002/0144599 A1 | * | 10/2002 | Afeiche | B01D 45/16 55/423 |
| 2005/0173335 A1 | * | 8/2005 | Rogers | B04C 5/12 210/512.1 |
| 2006/0000111 A1 | * | 1/2006 | Cho | D06F 58/24 34/604 |
| 2006/0021356 A1 | | 2/2006 | Milde et al. | |
| 2007/0251386 A1 | * | 11/2007 | Swank | B04C 5/15 95/271 |
| 2008/0110140 A1 | * | 5/2008 | Egger | B01D 50/20 55/337 |
| 2008/0271421 A1 | * | 11/2008 | Darke | B04C 3/06 55/396 |
| 2010/0237008 A1 | * | 9/2010 | Goninan | B04C 5/26 210/512.1 |
| 2016/0136555 A1 | * | 5/2016 | Yoshioka | F04B 39/04 55/447 |
| 2017/0001133 A1 | * | 1/2017 | Ishida | B04B 5/12 |
| 2018/0229586 A1 | * | 8/2018 | Army | B01D 46/0045 |
| 2018/0354626 A1 | * | 12/2018 | Himmelmann | B64D 13/06 |
| 2019/0009203 A1 | * | 1/2019 | Himmelmann | B64D 13/08 |
| 2019/0168147 A1 | * | 6/2019 | Bratton | B01D 45/12 |
| 2019/0276155 A1 | * | 9/2019 | Walsh | B01D 5/0081 |

\* cited by examiner

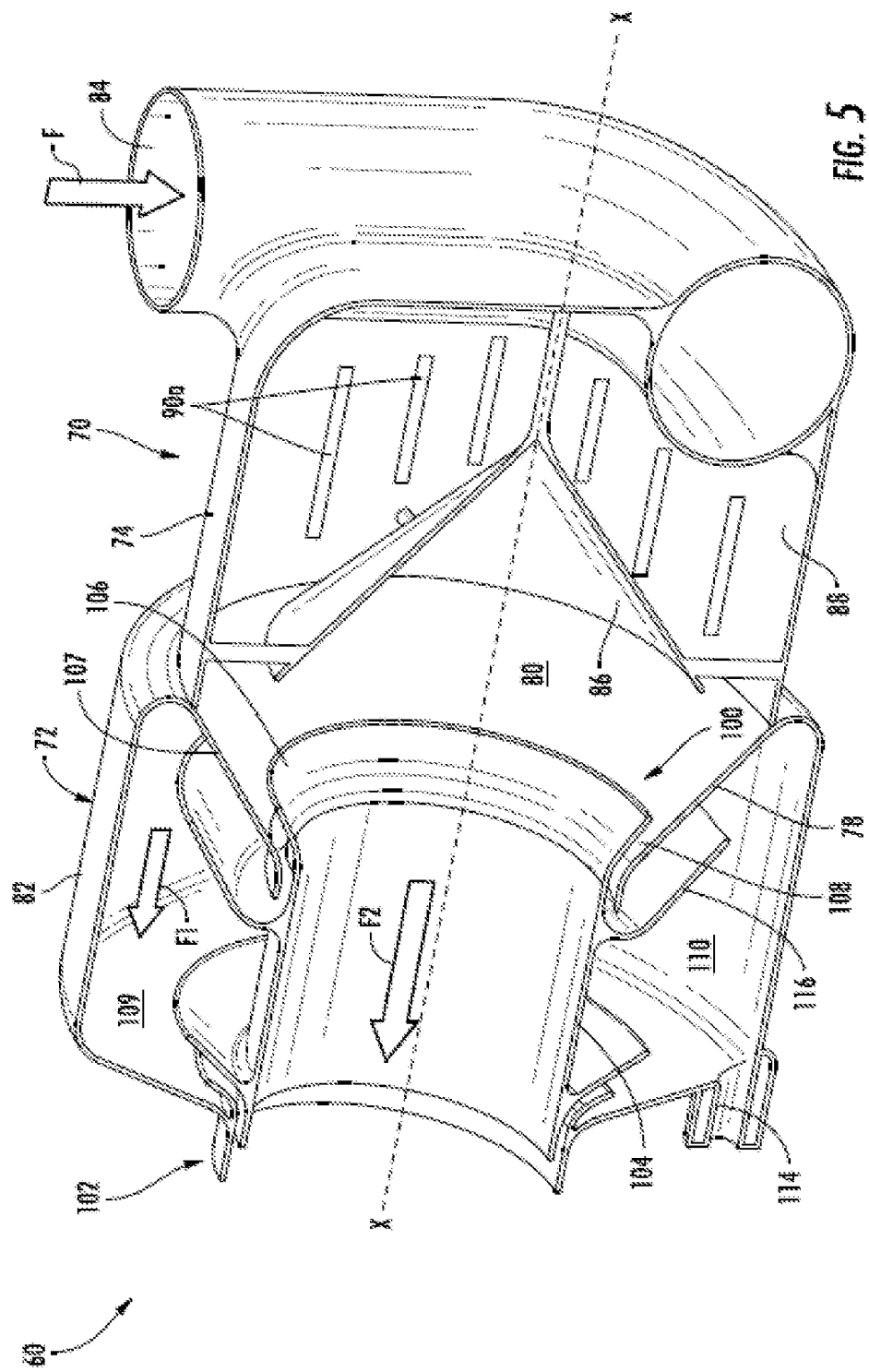

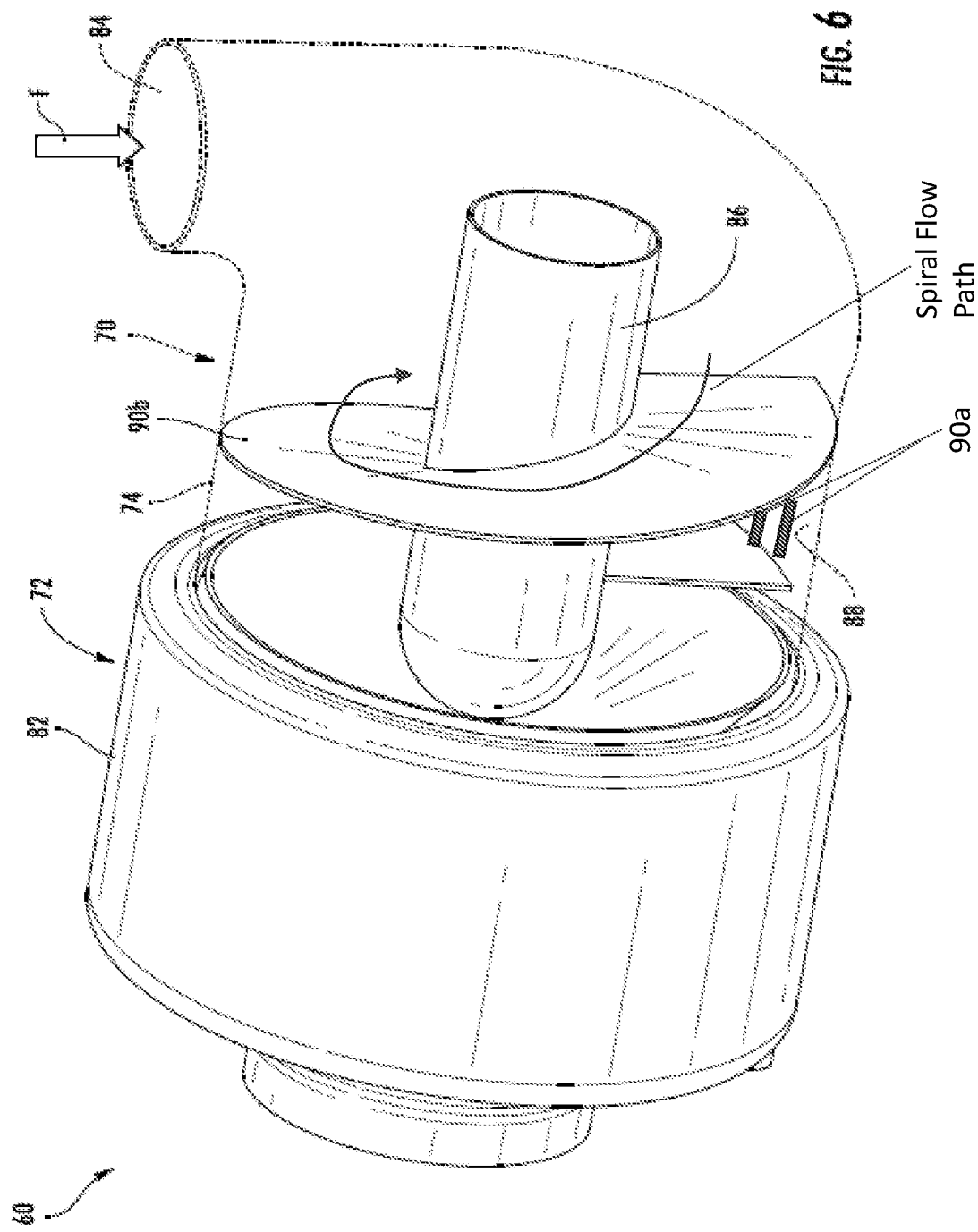

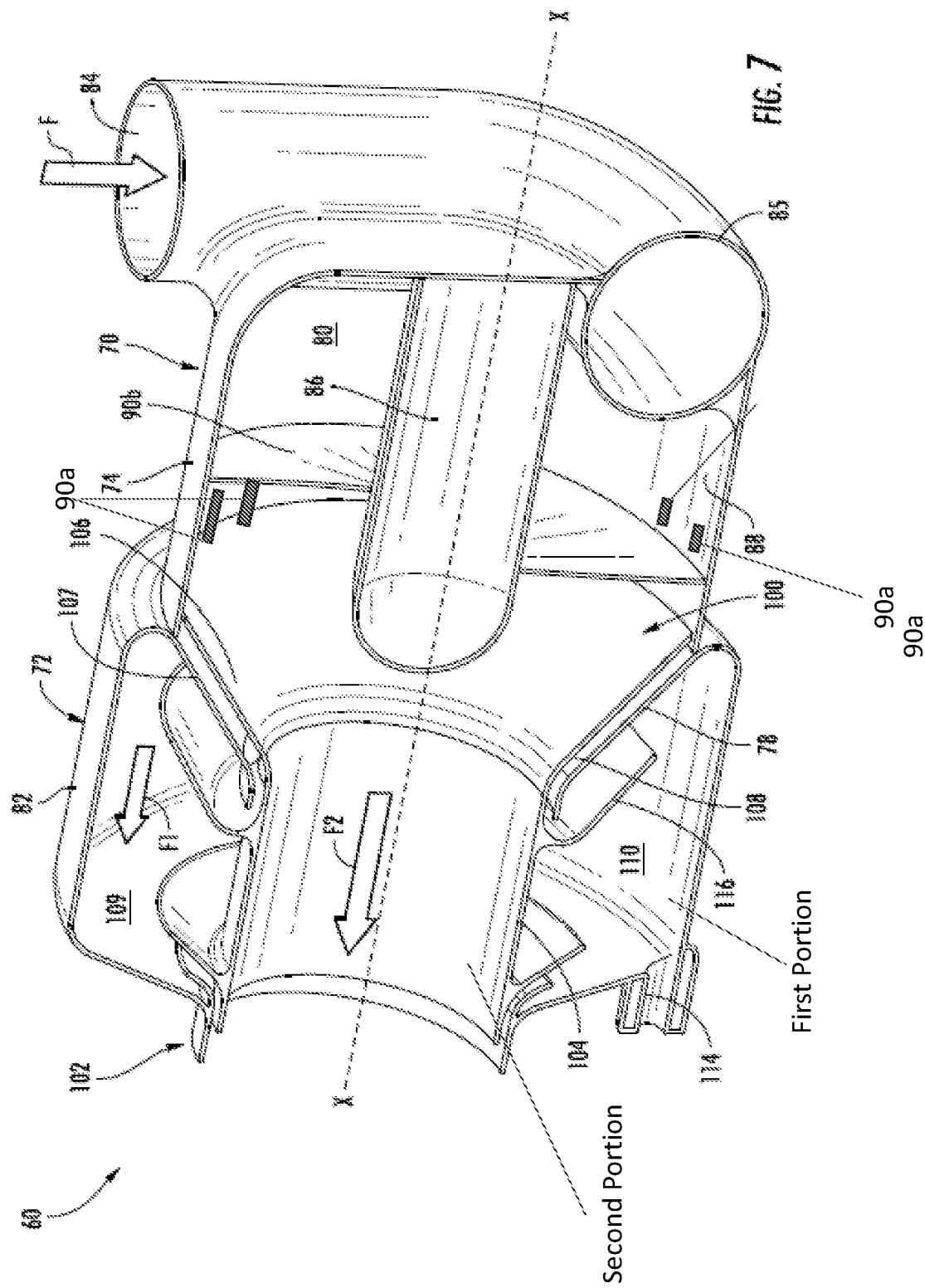

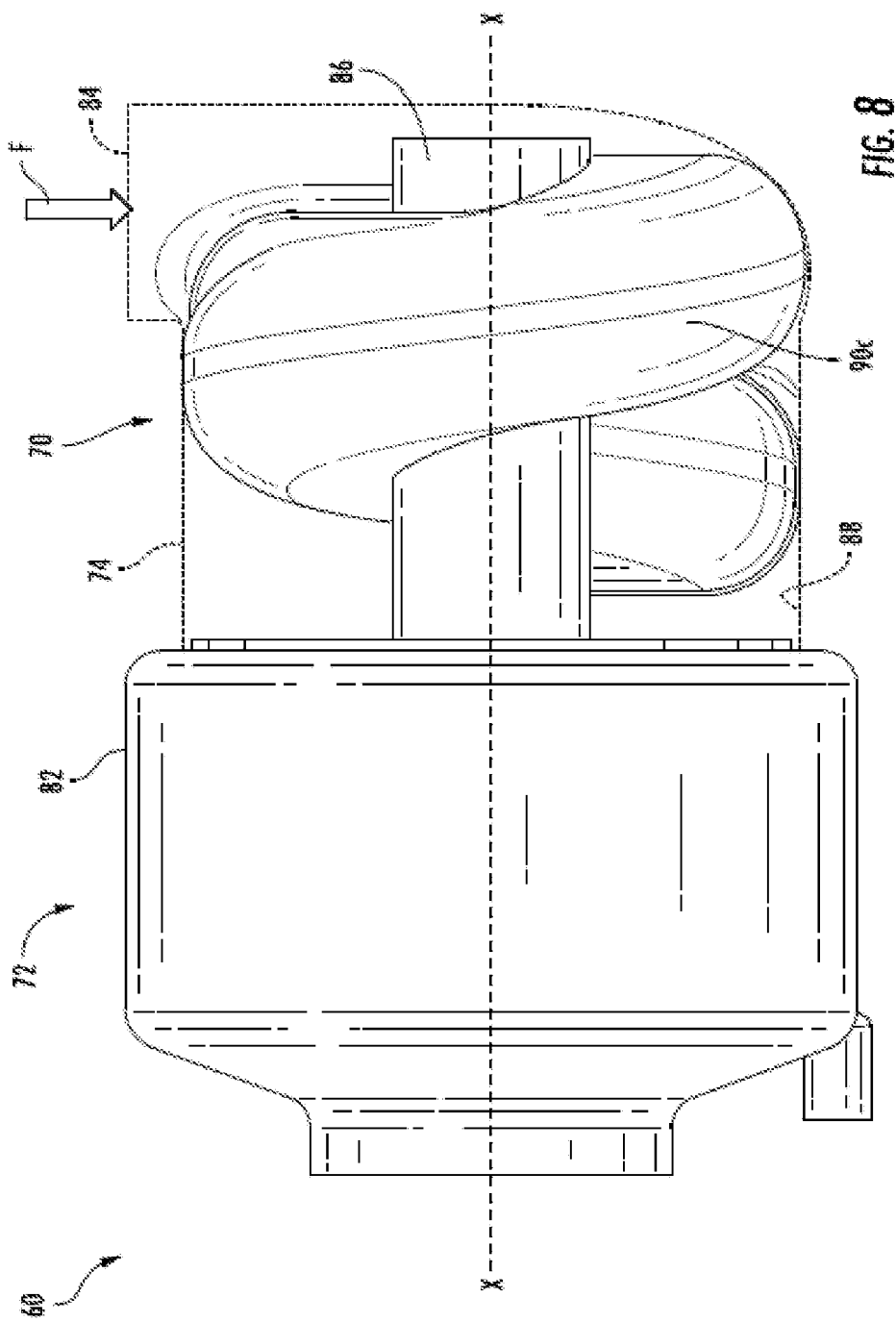

CENTRIFUGAL WATER COLLECTOR WITH CONICAL WATER SCUPPER

BACKGROUND

Exemplary embodiments disclosed herein relate to environmental control systems and, more particularly, to removal of water from an airflow within an aircraft environmental control system (ECS).

As a humid airflow is cooled within a component of an environmental control system of an aircraft, condensation typically forms resulting in moisture being entrained within the airflow. This moisture, which is commonly droplets of water, is generally removed by a water collector. If the moisture is not removed from the airflow, the moisture may freeze causing a build-up of ice on one or more component of the environmental control system. The ice can lead to imbalance due to non-uniform shedding thereof, thereby reducing system reliability and efficiency. The moisture buildup may also lead to corrosion of the system components.

BRIEF DESCRIPTION

According to an embodiment, a water extractor for an environmental control system of an aircraft includes a separation mechanism configured to divide an airflow into a first airflow and a second airflow. The separation mechanism includes an inlet conduit, a body in fluid communication with the inlet conduit, and at least one coalescing feature arranged within an interior of the body. A water extraction vessel is arranged in fluid communication with the separation mechanism. The water extraction vessel includes a first portion for receiving the first airflow and a second portion for receiving the second airflow. The first portion is configured to collect and remove water from the first airflow.

In addition to one or more of the features described above, or as an alternative, in further embodiments the inlet conduit is oriented at an angle to a longitudinal axis of the body.

In addition to one or more of the features described above, or as an alternative, in further embodiments the body of the separation mechanism includes a downstream end and the water extraction vessel includes a guide duct having a scupper arranged within the body adjacent the downstream end, wherein an axial length of the scupper is equal to an axial length of the downstream end.

In addition to one or more of the features described above, or as an alternative, in further embodiments the inlet conduit is offset from a center of the body such that the airflow is provided to a hollow interior of the body at an outer periphery of the body.

In addition to one or more of the features described above, or as an alternative, in further embodiments the second airflow is located at a center of the body and the first airflow is arranged about a periphery of the second airflow.

In addition to one or more of the features described above, or as an alternative, in further embodiments the at least one coalescing feature includes a groove formed in an interior surface of the body.

In addition to one or more of the features described above, or as an alternative, in further embodiments the at least one coalescing feature includes a protrusion extending from an interior surface of the body.

In addition to one or more of the features described above, or as an alternative, in further embodiments the at least one coalescing feature defines a spiral flow path through the body.

In addition to one or more of the features described above, or as an alternative, in further embodiments comprising an inner member positioned within a hollow interior of the body, a longitudinal axis of the inner member being coaxial with the longitudinal axis of the body.

In addition to one or more of the features described above, or as an alternative, in further embodiments the at least one coalescing feature includes a helical guide that extends between the inner member and an interior surface of the body.

In addition to one or more of the features described above, or as an alternative, in further embodiments the at least one coalescing feature includes an enclosed helical channel wrapped about the inner member.

In addition to one or more of the features described above, or as an alternative, in further embodiments a wall of the enclosed helical channel has a radius.

According to an embodiment, an environmental control system of an aircraft includes a turbine configured to extract energy and heat from an airflow and a water extractor arranged in fluid communication with an outlet of the turbine. The water extractor includes a separation mechanism for separating the airflow into a first airflow having water entrained therein and a second airflow and a water extraction vessel axially aligned and in fluid communication with the separation mechanism. The water extraction vessel includes a first portion for receiving the first airflow and a second portion for receiving the second airflow. The first portion is configured to collect and remove the water from the first airflow.

In addition to one or more of the features described above, or as an alternative, in further embodiments the airflow output from the turbine has water entrained therein, and the water within the airflow is a fog.

In addition to one or more of the features described above, or as an alternative, in further embodiments the airflow is provided to the separation mechanism at an angle to a central axis of the separation mechanism.

In addition to one or more of the features described above, or as an alternative, in further embodiments the separation mechanism includes a body and at least one coalescing feature is arranged within the interior of the body.

In addition to one or more of the features described above, or as an alternative, in further embodiments the at least one coalescing feature includes a groove formed in an interior surface of the body.

In addition to one or more of the features described above, or as an alternative, in further embodiments the at least one coalescing feature includes a protrusion extending from an interior surface of the body.

In addition to one or more of the features described above, or as an alternative, in further embodiments the at least one coalescing feature defines a spiral flow path through the body.

In addition to one or more of the features described above, or as an alternative, in further embodiments the separation mechanism includes a downstream end and the water extraction vessel includes a guide duct having a scupper arranged within the separation mechanism adjacent to the downstream end, wherein an axial length of the scupper is equal to an axial length of the downstream end.

BRIEF DESCRIPTION OF THE DRAWINGS

The following descriptions should not be considered limiting in any way. With reference to the accompanying drawings, like elements are numbered alike:

FIG. 5 is a perspective cross-sectional view of a water extractor according to an embodiment;

FIG. 6 is a perspective, partially see-thru view of a water extractor according to an embodiment;

FIG. 7 is a cross-sectional view of the water extractor of FIG. 6 according to an embodiment;

FIG. 8 is a side view of a water extractor according to an embodiment; and

DETAILED DESCRIPTION

A detailed description of one or more embodiments of the disclosed apparatus and method are presented herein by way of exemplification and not limitation with reference to the Figures.

Embodiments herein provide an environmental control system having a separator for separating a liquid from a tangential flow of a medium upstream from a water collection vessel. The medium described herein is generally air and the liquid described herein is generally water; however, it should be understood that other mediums and liquids are also contemplated herein.

Figure 1:
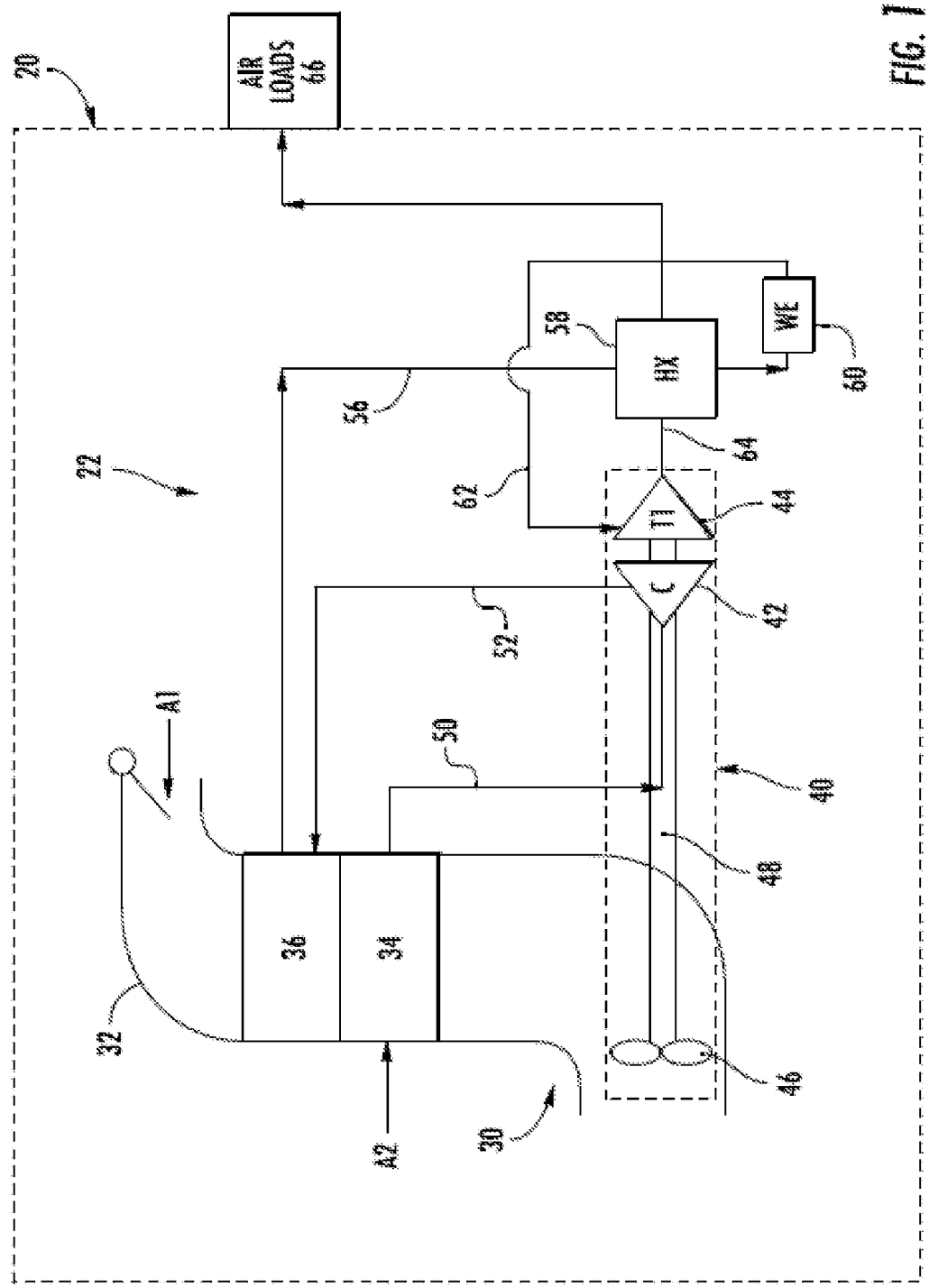
FIG. 1 is a schematic diagram of an example of an environmental control system of a vehicle.

With reference now to FIG. 1, a schematic diagram of an example of a portion 22, also referred to as a "pack," of an environmental control system (ECS) is depicted according to a non-limiting embodiment. Although the environmental control system 20 is described with reference to an aircraft, alternative applications are also within the scope of the disclosure.

Each pack 22 of an environmental control system (ECS) 20 includes a RAM air circuit 30 including a shell or duct 32 within which one or more heat exchangers are located. The shell 32 can receive and direct a medium A1, such as ram air for example, through a portion of the system 20. The one or more heat exchangers are devices built for efficient heat transfer from one medium to another. Examples of the type of heat exchangers that may be used, include, but are not limited to, double pipe, shell and tube, plate, plate and shell, adiabatic shell, plate fin, pillow plate, and fluid heat exchangers.

The one or more heat exchangers arranged within the shell 32 may be referred to as ram heat exchangers. In the illustrated, non-limiting embodiment, the ram heat exchangers include a primary heat exchanger 34 and a secondary heat exchanger 36. Within the primary and secondary heat exchangers 34, 36, ram air, such as outside air for example, acts as a heat sink to cool one or more mediums.

The pack 22 additionally comprises at least one compressing device 40. Each compressing device 40 includes a compressor 42, a turbine 44, and a fan 46, all of which are operably coupled to one another via a shaft 48. In an embodiment, in combination the fan 46, compressor 42, and turbine 44 define an air cycle machine (ACM). The compressor 42 is a mechanical device that raises a pressure of a medium and can be driven by another mechanical device (e.g., a motor or a medium via a turbine). Examples of compressor types include centrifugal, diagonal or mixed-flow, axial-flow, reciprocating, ionic liquid piston, rotary screw, rotary vane, scroll, diaphragm, air bubble, etc.

The turbine 44 is a mechanical device that expands and extracts work from a medium (also referred to as extracting energy). In the compressing device 40, the turbine 44 drives the compressor 42 and the fan 46 via the shaft 48. The fan 46 is a mechanical device that can force via push or pull methods the medium A1 (e.g., ram air) through the shell 32 and across the heat exchangers 34, 36 and at a variable cooling to control temperatures.

In operation, the ECS pack 22 is supplied with a medium A2, such as air bled from a gas turbine engine of the aircraft for example. It should be understood that the ECS may include any number of ECS packs 22 configured to supply conditioned air to various heat loads of the aircraft. The medium A2 is input to the primary heat exchanger 34 such that the medium A2 is in a heat exchange relationship with another medium A1, such as ram or ambient air for example. After the bleed air A2 is cooled in the primary heat exchanger 34, the resulting cooler air is communicated through a passage 50 to the compressor 42 of the compressing device 40. Within the compressor, the second medium A2 is compressed to a high pressure.

Compressed second medium A2 exits the compressor 42 through a passage 52 and is provided to the secondary heat exchanger 36 where the second medium A2 is further cooled by heat exchange with the first medium A1. Compressed, cooled air having water vapor entrained therein exits from the secondary heat exchanger 36 and flows through a duct 56 to a condensing heat exchanger 58. The condensing heat exchanger 58 is configured to further cool the second medium A2 and water is separated from the cooled second medium A2 via a water extractor 60. Dehumidified air exits the water extractor 60 and is provided, through a passage 62, to the turbine 44. The bleed air A2 is expanded and water vapor in the air is further condensed through the turbine 44 of the ACM 40. The cooled second medium A2 flows through a passage 64 back to the condensing heat exchanger 58, where the air is heated to a relatively warmed temperature, and is then supplied to the one or more air loads (illustrated schematically at 66) of the aircraft, such as to the cabin for example.

It should be understood that the ECS pack 22 illustrated and described herein is intended as an example only, and that any ECS system 20 including a water extractor 60 is within the scope of the disclosure. In an embodiment, the ECS system 20 may be configured such that the water extractor 60 is arranged directly downstream from an outlet of the turbine 44. In such embodiments, the water contained within the airflow provided to the water extractor 60 is a fine mist or fog.

With reference now to FIGS. 2-9, various examples of a water extractor 60 suitable for use in an ECS system 20 are illustrated. As shown, the water extractor 60 includes a separation mechanism 70 fluidly mechanically and fluidly coupled to a water extraction vessel 72. In an embodiment, the separation mechanism 70 and the water extraction vessel 72 are integrally formed, such a via an additive manufacturing process for example. The separation mechanism 70 is configured to separate water from an airflow provided thereto.

Figure 4:
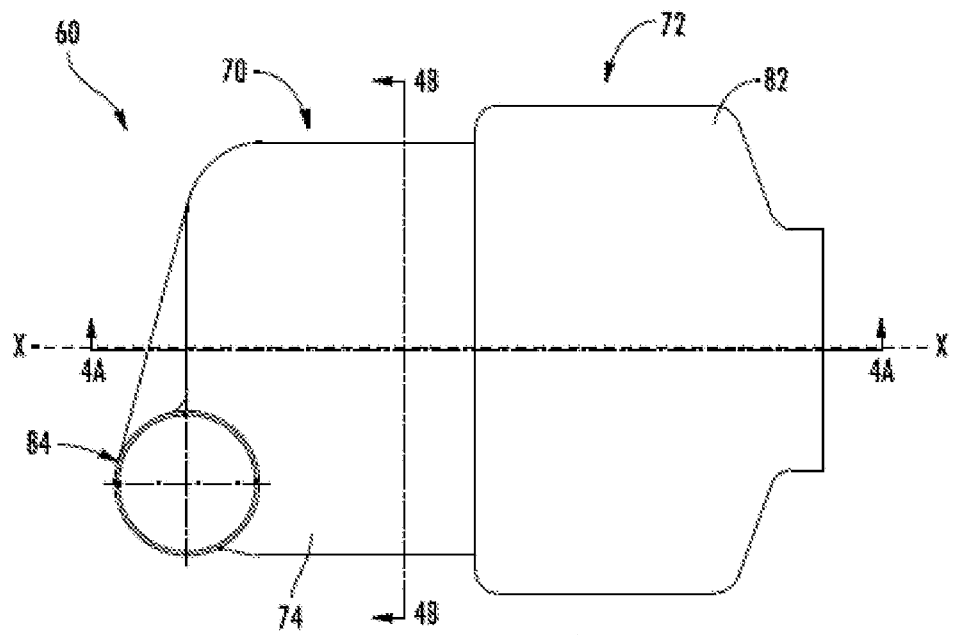
FIG. 4 is a schematic diagram of a water extractor according to an embodiment.
Figure 4B:
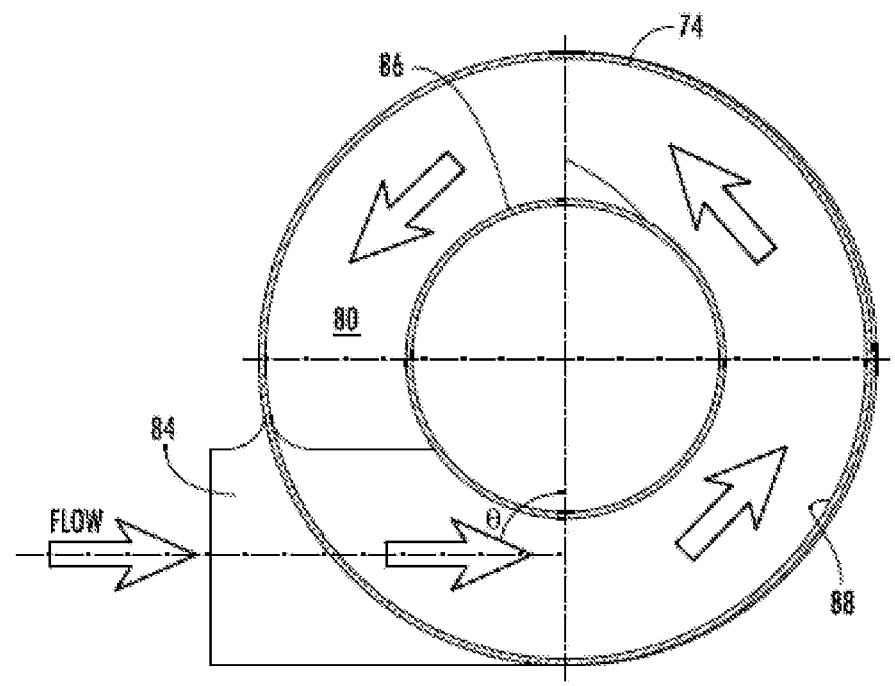
FIG. 4B is a cross-sectional view of the water extractor of FIG. 4 taken along line B-B according to an embodiment.
Figure 4A:
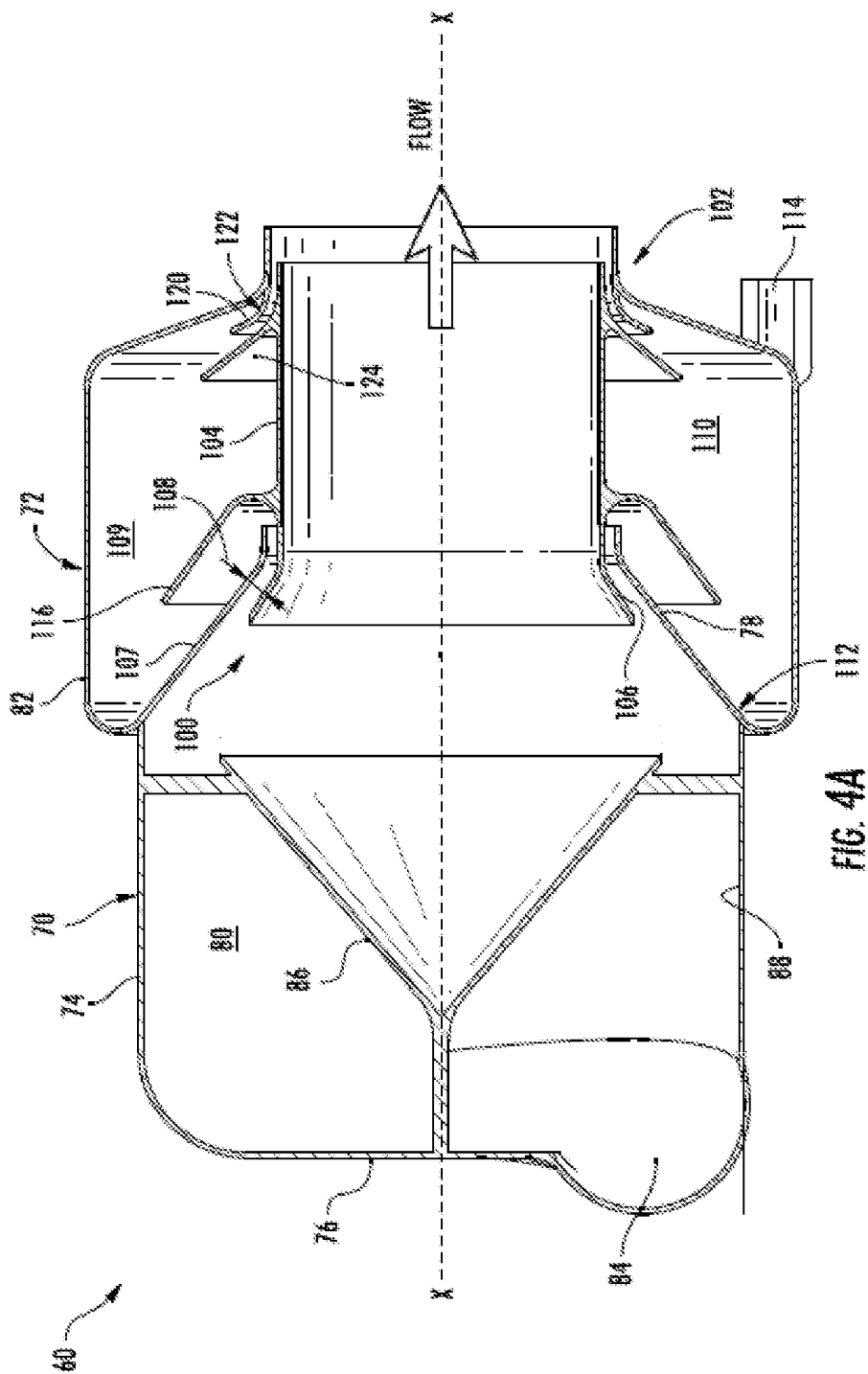
FIG. 4A is a cross-sectional view of the water extractor of FIG. 4 taken along line A-A according to an embodiment.

The separation mechanism 70 includes a housing or body 74 having a first, upstream end 76 and a second, downstream end 78 relative to an airflow (see FIG. 4A) that define a longitudinal axis X of the body 74. The upstream end 76 of the body 74 is closed or sealed to direct the airflow within the hollow interior 80 of the body 74 towards the downstream end 78. The downstream end 78 is open and may be directly or indirectly connected to the water extraction vessel 72. In the illustrated, non-limiting embodiment, the downstream end 78 of the body 74 has a frustoconical configuration, such that a diameter of the body at the downstream end 78 gradually decreases in the direction of flow as best seen in FIG. 4A. Further, a portion of the water extraction vessel 72, such as an outer housing 82 thereof for example, may be configured to axially overlap the downstream end 78 of the separation mechanism 70. In such embodiments, the exterior surface of the body 74 at the downstream end 78 may form a sidewall of the water extraction vessel 72. Although the water extraction vessel 72 is shown as being mounted concentrically about the substantial entirety of the axial length (measured along a central axis X of the separation mechanism 70) of the downstream end 78, embodiments where the water extraction vessel 72 axially overlaps with only a portion of the downstream end 78 are also contemplated herein.

As shown, the body 74 of the separation mechanism 70 is generally cylindrical in shape, having a substantially constant diameter upstream from the downstream end 78 thereof. However, embodiments where the body 74 of the separation mechanism 70 has another configuration are also contemplated herein.

Figure 2:
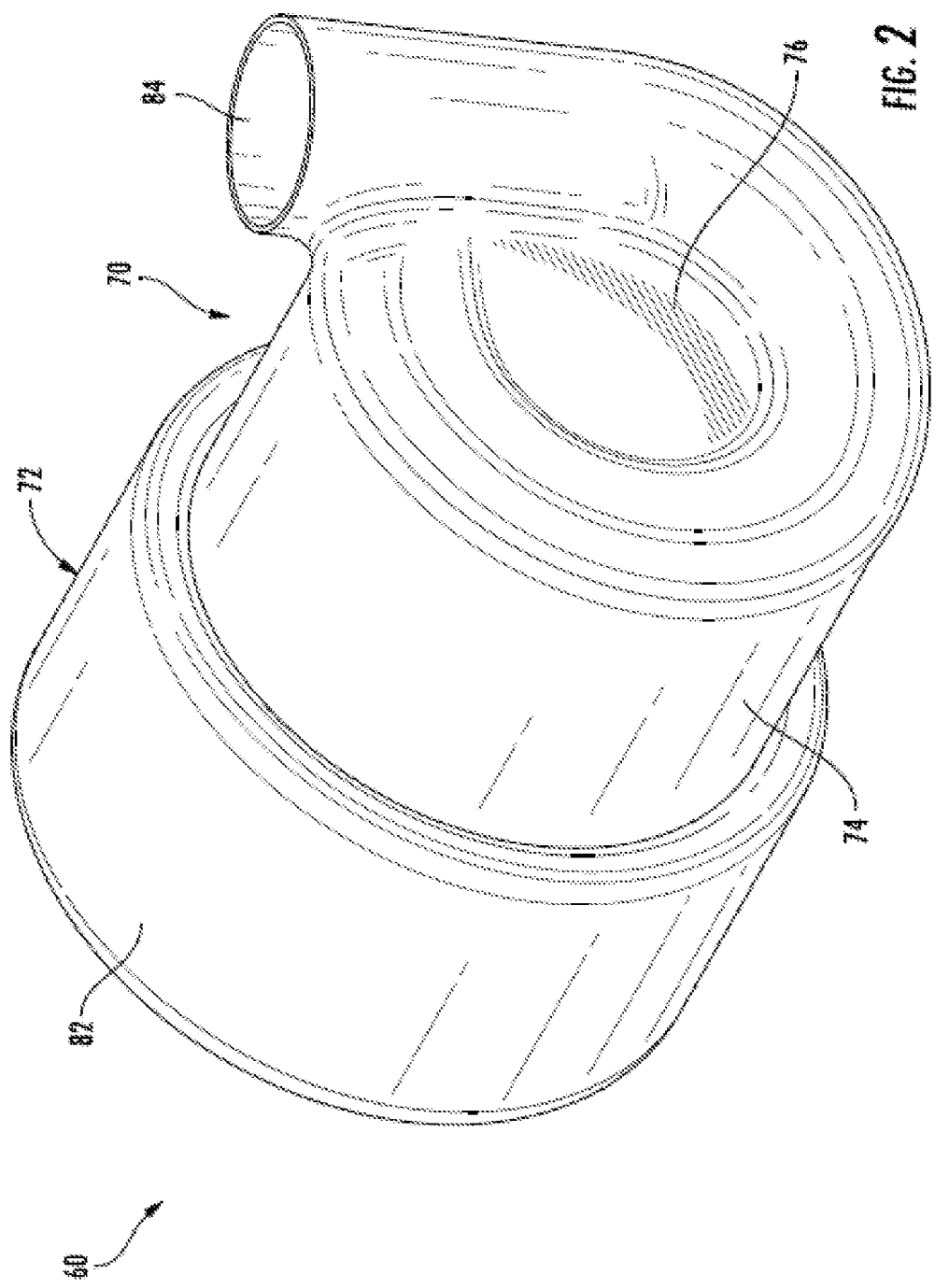
FIG. 2 is a front perspective view of a water extractor according to an embodiment.
Figure 3:
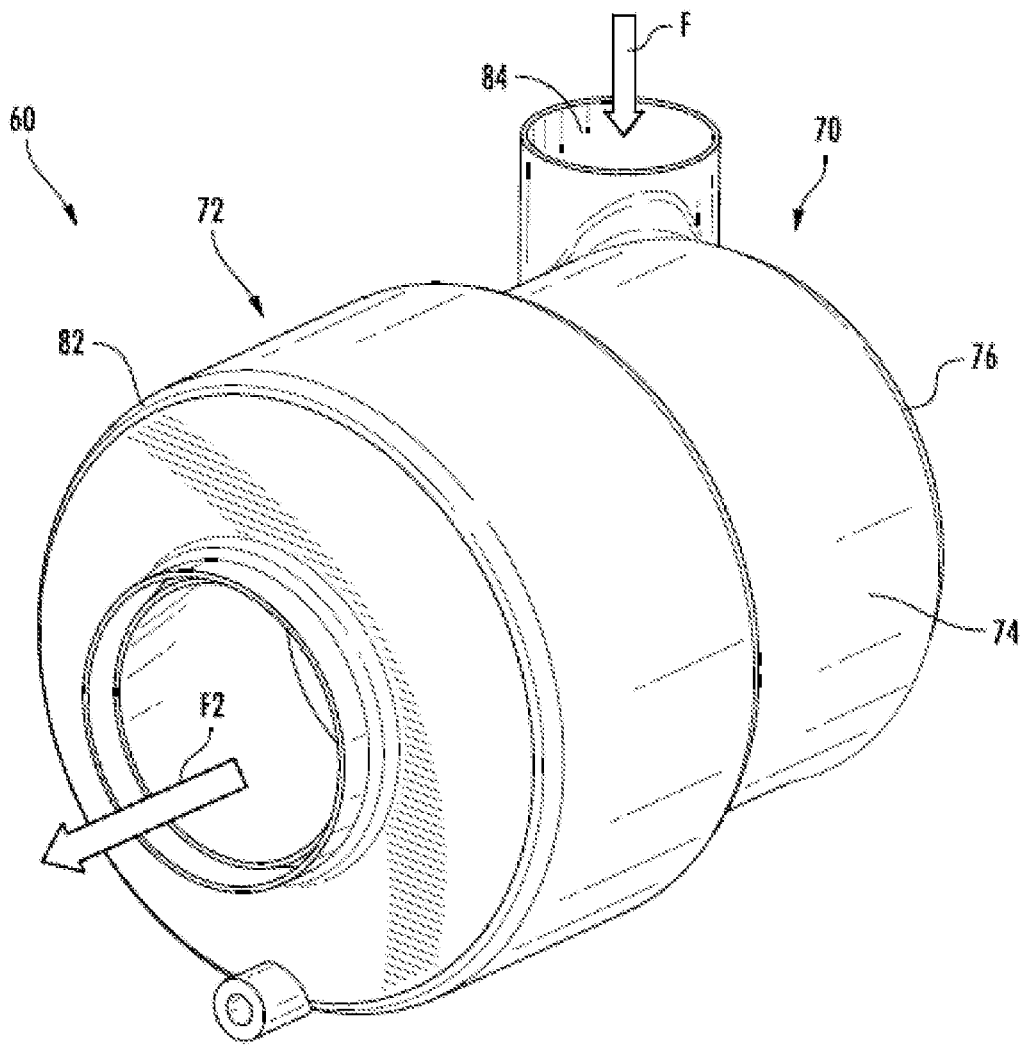
FIG. 3 is a rear perspective view of the water extractor of FIG. 2 according to an embodiment.

The separation mechanism 70 additionally includes an inlet conduit 84 which extends at an angle θ (see FIG. 4B) to the longitudinal axis X of the body 74. In the illustrated, non-limiting embodiment, the angle θ is shown as being 90 degrees such that the inlet conduit 84 is generally perpendicular to the longitudinal axis X of the body 74. However, embodiments where the angle θ is less than or greater than 90 degrees, such as between about 5 degrees and about 175 degrees for example, are also contemplated herein. The inlet conduit 84 may be fluidly connected to the hollow interior 80 of the body 74 near the first end 76 to maximize the length of the flow path of the airflow within the body 74. As shown, at least a portion of the inlet conduit 84 may be integrally formed with the upstream end 76 of the body 74. In an embodiment, as best shown in FIGS. 2, 5, and 6, the inlet conduit 84 is connected to the hollow interior 80 adjacent a periphery of the hollow interior 80, offset from the longitudinal axis X, such as in a tangential configuration for example. The inlet conduit 84 may be configured to wrap between 90 degrees and 270 degrees, such as about 180 degrees for example, about the periphery of the first, upstream end 76 of the body 74 before the fluid within the inlet conduit 84 is delivered to the hollow interior 80.

The cross-sectional area of the inlet conduit 84 may remain constant over its length. Alternatively, the cross-sectional area of the inlet conduit 84, and in some embodiments, the shape of the inlet conduit 84, may vary over the length of the inlet conduit 84. For example, the cross-sectional area may gradually decrease in the direction of flow.

In an embodiment, best shown in FIGS. 5, 6, and 8, a center body 86 extends within the hollow interior 80 of the body 74, along at least a portion of the longitudinal axis X thereof. For example, the center body 86 may be integrally formed with or coupled to the first end 76 or another portion of the body 74. The center body 86 may have a shape similar to or different from the shape of the body 74. For example, the center body 86 illustrated in FIG. 5, is generally conical in shape, with the diameter increasing in the direction of fluid flow. In another embodiment, illustrated in FIGS. 6 and 7, the center body 86 is generally cylindrical in shape. Regardless of shape, the longitudinal axis of the center body 86 and the longitudinal axis X of the body 74 are arranged generally coaxially. An outer diameter of the center body 86 is smaller than an inner diameter of the body 74 such that the airflow is able to flow about the periphery of the center body 86, between the center body 86 and the interior surface 88 of the body 74, over the length of the body 74.

Alternatively, or in addition, the separation mechanism 70 may include one or more coalescing features configured to enhance the formation of a water stream at the interior surface 88 of the body 74, such as by creating surface tension and/or adhesion of the water to the interior surface 88. In an embodiment, the at least one coalescing feature includes one or more grooves or indentations 90a formed in the interior surface 88 of the body 74, or alternatively or in addition, one or more ridges 90a formed at and protruding inwardly from the interior surface 88 of the body 74 (see FIG. 5). The grooves/ridges 90a may be spaced about the periphery of the interior surface 88 of the body 74. Further, the grooves/ridges 90a may extend parallel to the longitudinal axis X, perpendicular to the longitudinal axis X, or at any other angle therebetween. Although the grooves/ridges 90a are shown as having a generally elongated, linear configuration, it should be understood that a groove or ridge 90a having any suitable shape or contour is within the scope of the disclosure.

Alternatively, or in addition, to the grooves and/or ridges 90a described above, the one or more coalescing features includes at least one helical guide 90b. As shown, the helical guide 90b has a generally flat or planar surface and extends generally between the center body 86 and the interior surface 88 of the body 74 such that the helical guide 90b defines a spiral flow path that wraps about at least a portion of the periphery of the center body 86. Accordingly, in an embodiment, the helical guide 90b may be integrally formed with one or both of the center body 86 and the body 74. In the illustrated, non-limiting embodiment, a continuous helical guide 90b extends over substantially the entire length of the body, such as from the intersection between the inlet conduit 84 and the hollow interior 80 to the downstream end 78 of the body 74. However, embodiments where a helical guide 90b extends over only a portion of the length of the body 74 and/or where a plurality of separate helical guides 90b are arranged to define a spiral flow path over all or a portion of the length of the body 74 are also contemplated herein.

Figure 9:
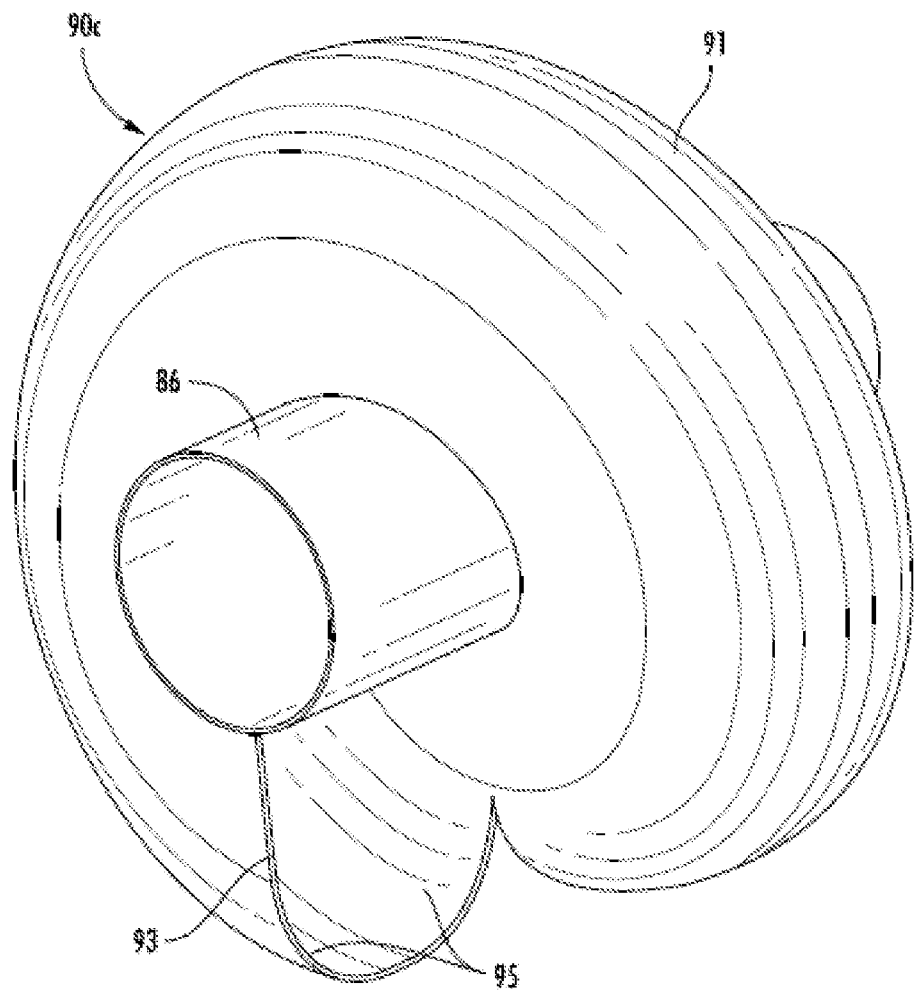
FIG. 9 is a perspective view of a helical channel of the water extractor of FIG. 8 according to an embodiment.

With reference now to FIGS. 8 and 9, in another embodiment, the one or more coalescing features includes a helical channel 90c. The helical channel 90c is arranged within the hollow interior 80 of the body 74 and wraps about the exterior of the center body 86. The helical channel 90c may, but need not be used in combination with one or both of the grooves and/or ridges 90a and the helical guide 90b. In an embodiment, the helical channel 90c and the center body 86 are integrally formed. The helical channel 90c defines an enclosed fluid flow path that is fluidly separated from the hollow interior 80. An exterior surface 91 of the helical channel 90c may, but need not contact the interior surface 88 of the body 74. Further, the side of the helical channel 90c that is arranged distal from the center body 86 may be smoothly connected with one or more of the adjacent sidewalls of the helical channel 90*c* via a radius of curvature, illustrated at 95.

In the illustrated, non-limiting embodiment, a first end 93 of the helical channel 90*c* is configured to abut or mate directly with an outlet end 85 of the inlet conduit 84 such that that inlet conduit 84 and the helical channel 90*c* form a continuous channel or flow path. In such embodiments, the helical channel 90*c* and the center body 86, in combination, may form the first end 76 of the body 74.

Similar to the helical guide 90*b* previously described, the helical channel 90*c* may extend over a portion or the majority of the axial length of the body 74. However, the helical channel 90*c* typically ends upstream from the downstream end 78 of the body 74. In an embodiment, the helical channel 90*c* is configured to wrap at least 360 degrees about the center body 86. However, embodiments where the helical channel 90*c* has a different wrap, such as 270 degrees or more than 360 degrees are also contemplated herein. The combination of the radii 95 and the centrifugal force resulting from the helical shape enhance the coalescing of the water within the airflow upstream from the water extraction vessel 72.

With reference now to FIGS. 4A, and 5-7, the water extraction vessel 72 is described in more detail. The water extraction vessel 72 includes an inlet portion 100 and an outlet portion 102. As previously described, the water extraction vessel 72 includes an outer housing 82 that may define a diffuser portion of the water extraction vessel 72 and additionally includes a guide duct 104 located centrally within the outer housing 82. The guide duct 104 may be generally cylindrical in shape and extends generally from the inlet portion 100 to the outlet portion 102 of the water extraction vessel 72. An upstream end 106 of the guide duct 104, also referred to herein as a scupper, is arranged within the hollow interior 80 of body 74 and may be flared radially outwardly, as shown. The upstream end 106 may be arranged parallel to the wall 107 of the downstream end 78 of the separation mechanism 70, or alternatively, may be oriented at another angle relative to the wall 107 of the downstream end 78.

A scupper gap 108 is defined between the upstream end 106 of the guide duct 104 and the wall 107 of downstream end 78. Accordingly, the configuration of the scupper gap 108 will vary based on the orientation of the upstream end 106 of the guide duct 104 relative to the downstream end 78 of the separation mechanism 70. In the non-limiting embodiment shown in FIG. 2, the axial length of the scupper 106 of the guide duct 104 is shorter than the axial length of the wall 107 or downstream end 78 of the body 74. In such embodiments, the inlet to the scupper gap 108 may be arranged generally near a center of the body 74. In other embodiments, best shown in FIG. 7, the axial length of the scupper 106 of the guide duct 104 may be substantially equal to the axial length of the downstream end 78 of the body 74. In such embodiments having an extended scupper, the inlet of the scupper gap 108 may be arranged generally adjacent to the interior surface 88 of a central portion of the body 74. For example, in the non-limiting embodiment, the inlet to scupper gap 108 is arranged at a portion of the body 74 having a constant diameter.

The annular outer housing 82 has a hollow interior 109 that surrounds the guide duct 104 and is attached to the inlet and output portions 100, 102. An exterior of the outer housing 82 may be constructed as a single component, or alternatively, may be defined by a plurality of segments for ease of assembly. In an embodiment, the outer housing 82 is integrally formed with the downstream end 78 of the separation mechanism 70. Arranged within the bottom section of the interior 109 of the outer housing 82 relative to a direction of gravity is a settling chamber 110 in which the moisture entrained within the airflow inside the outer housing 82 falls naturally therefrom. In an embodiment, an opening 112 (FIG. 4A) is formed in a portion of the downstream end 78 of the body 74 generally adjacent the settling chamber 110. As a result, any water collected on the surface of the body 74 may pass through the opening 112 directly into the settling chamber 110. Further, a drain 114 may be provided at the bottom of the outer housing 82 in fluid communication with the settling chamber 110. The placement of the drain 114 depends generally on the angular orientation of the settling chamber 110 to allow for gravitational drainage.

In an embodiment, an air guide 116 is positioned within the interior 109 of the outer housing 82. The air guide 116 may be attached to an exterior surface of the guide duct 104, or alternatively or in addition, may be connected to an interior surface of the outer housing 82, such as via one or more webs for example. The air guide 116 defines a labyrinth flow path which causes the airflow to decelerate within relatively short axial and radial dimensions. In the illustrated, non-limiting embodiment, the air guide 116 includes a wall that extends rearwardly, generally toward the inlet portion 100. The wall may, but need not be oriented parallel to an adjacent surface of the outer housing 82, or the downstream end 78 of the separation mechanism 70. Further, as the airflow contacts the surfaces of the air guide 116 and the outer housing 82, the water within the airflow will condense thereon and fall via gravity into the settling chamber 110.

An ejector wall 120 may extend from the outlet portion 102 into the interior of the outer housing 82. In the illustrated, non-limiting embodiment, the wall 120 has a flared end that is oriented against the airflow through the water extraction vessel 72. As shown, an ejector 122 may be defined between the wall 120 and the exterior of the guide duct 104. In an embodiment, the ejector 122 is defined between the wall 120 and a vane 124 extending from an exterior of the guide duct 104.

In operation, an airflow F having condensation, such as water for example, included therein is provided to the water extractor 60. The airflow passes through the inlet conduit 84 into the hollow interior 80 of the separation mechanism 70. The tangential position of the inlet conduit 84 relative to the hollow interior 80 in combination with center body 86 imparts a rotational motion to the airflow F about longitudinal axis X. This rotation in combination with the one or more coalescing features 90*a*, 90*b*, 90*c* of the separation mechanism 70 facilitates separation of the droplets of condensate from the airflow F. The centrifugal force acting on the rotating airflow drives the droplets to the periphery of the airflow F, adjacent the interior surface 88 of the body 74.

Upon reaching the interior surface 88, the droplets may coalesce into a first fluid stream or airflow F1 and the dry air at the center of the body 74 forms a second fluid stream or airflow F2. A portion of the water droplets that have coalesced at the interior surface 88 may fall via gravity to a bottom of the body 74. The airflow F may push this water through the opening 112 into the settling chamber 110 of the water extraction vessel 72.

As the first and second airflow F1, F2 enter the water extraction vessel 72, the second airflow F2 flows from the inlet portion 100 to the outlet portion 102 through the interior of the guide duct 104 to a downstream component of the environmental control system 20. The first airflow F1 is separated from the second fluid stream F2, and is provided to the water extraction vessel 72 through the scupper gap 108. The first airflow F1 containing moisture laden air flows about the exterior of the guide duct 104 and the air guide 116 through the interior 109 of the outer housing 82. As the volume of the flow path defined by the air guide 116 and the outer housing 82 increases, the airflow F1 is slowed allowing the water droplets within the airflow F1 to coalesce on the walls of the flow path and collect within the settling chamber 110. The dehumidified air of the first airflow F1 is then rejoined with the second airflow F2 via the ejector 122 adjacent the outlet portion 102. Accordingly, a combination of the force due to gravity and reduced velocities, will cause the water droplets to fall naturally into the settling chamber 110 for subsequent drainage via drain 114. The water may then be provided to another system, such as for cooling or cleaning for example, or may be expelled from the aircraft.

The water extractor 60 illustrated and described herein facilitates the separation of water from an airflow. The water extractor 60 may be particularly useful for removing water from an airflow when the water is in the form or a mist or fog, such as may be received from an outlet of a turbine.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A water extractor for an environmental control system of an aircraft comprising:
   a separation mechanism configured to divide an airflow into a first airflow and a second airflow, the separation mechanism including:
   an inlet conduit;
   a body in fluid communication with the inlet conduit;
   a center body arranged within an interior the body;
   a first coalescing feature arranged within the interior of the body, the first coalescing feature including at least one of a groove formed in the interior surface of the body and a ridge protruding inwardly from the interior surface of the body, the first coalescing feature having a linear configuration; and
   a second coalescing feature including a continuous helical guide wrapped about a periphery of the center body and extending, between the center body and the interior surface of the body, the helical guide cooperating with the inlet conduit to impart a rotational motion to the airflow about a longitudinal axis of the body, wherein the first coalescing feature is located in overlapping arrangement with the second coalescing feature relative to a longitudinal axis of the body; and
   a water extraction vessel arranged in fluid communication with the separation mechanism, the water extraction vessel including a first portion for receiving the first airflow and a second portion for receiving the second airflow, the first portion being configured to collect and remove water from the first airflow.

2. The water extractor of claim 1, wherein the inlet conduit is oriented at an angle to a longitudinal axis of the body.

3. The water extractor of claim 1, wherein the body of the separation mechanism includes a downstream end and the water extraction vessel includes a guide duct having a scupper arranged within the body adjacent the downstream end, wherein an axial length of the scupper is equal to an axial length of the downstream end.

4. The water extractor of claim 1, wherein the inlet conduit is offset from a center of the body such that the airflow is provided to a hollow interior of the body at an outer periphery of the body.

5. The water extractor of claim 1, wherein the second airflow is located at a center of the body and the first airflow is arranged about a periphery of the second airflow.

6. The water extractor of claim 1, wherein the second coalescing feature defines a spiral flow path through the body.

7. The water extractor of claim 6, wherein the second coalescing feature is connected to the center body and a longitudinal axis of the center body being coaxial with the longitudinal axis of the body.

8. The water extractor of claim 1, wherein the second coalescing feature includes an enclosed helical channel wrapped about the center body.

9. The water extractor of claim 1, wherein a wall of the enclosed helical channel has a radius.

* * * * *